United States Patent
Cheng et al.

(10) Patent No.: US 10,075,722 B1
(45) Date of Patent: Sep. 11, 2018

(54) MULTI-CORE VIDEO DECODER SYSTEM HAVING AT LEAST ONE SHARED STORAGE SPACE ACCESSED BY DIFFERENT VIDEO DECODER CORES AND RELATED VIDEO DECODING METHOD

(71) Applicant: MEDIATEK INC., Hsin-Chu (TW)

(72) Inventors: Chia-Yun Cheng, Hsinchu County (TW); Shun-Hsiang Chuang, Taipei (TW); Yung-Chang Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 300 days.

(21) Appl. No.: 14/537,850

(22) Filed: Nov. 10, 2014

Related U.S. Application Data

(60) Provisional application No. 61/904,501, filed on Nov. 15, 2013.

(51) Int. Cl.
| | |
|---|---|
| *H04N 19/44* | (2014.01) |
| *H04N 7/12* | (2006.01) |
| *H04J 3/06* | (2006.01) |
| *H04N 7/18* | (2006.01) |
| *H04N 11/02* | (2006.01) |

(52) U.S. Cl.
CPC .................. *H04N 19/44* (2014.11)

(58) Field of Classification Search
CPC ....................................... H04N 19/44
USPC ...................................... 375/240.25
See application file for complete search history.

(56) References Cited

U.S. PATENT DOCUMENTS

| | | | | |
|---|---|---|---|---|
| 5,920,352 | A * | 7/1999 | Inoue | G09G 5/39 348/384.1 |
| 6,538,656 | B1 * | 3/2003 | Cheung | G06T 9/007 345/519 |
| 2003/0189982 | A1 * | 10/2003 | MacInnis | H04N 19/176 375/240.24 |
| 2010/0246679 | A1 * | 9/2010 | Dey | H04N 19/61 375/240.16 |

\* cited by examiner

*Primary Examiner* — Hee-Yong Kim
(74) *Attorney, Agent, or Firm* — Winston Hsu

(57) ABSTRACT

A multi-core video decoder system includes a plurality of video decoder cores and a storage device. The video decoder cores are used to decode a picture, wherein each of the video decoder cores decodes a portion of the picture. The storage device has at least one shared storage space accessed by different video decoder cores of the video decoder cores. In addition, an associated video decoding method includes: performing a plurality of video decoding operations to decode a picture, wherein each of the video decoding operations decodes a portion of the picture; and controlling different video decoding operations of the video decoding operations to access at least one shared storage space.

8 Claims, 12 Drawing Sheets

(A)

(B)

MULTI-CORE VIDEO DECODER SYSTEM HAVING AT LEAST ONE SHARED STORAGE SPACE ACCESSED BY DIFFERENT VIDEO DECODER CORES AND RELATED VIDEO DECODING METHOD

CROSS REFERENCE TO RELATED APPLICATIONS

This application claims the benefit of U.S. provisional application No. 61/904,501, filed on Nov. 15, 2013 and incorporated herein by reference.

BACKGROUND

The disclosed embodiments of the present invention relate to video decoding, and more particularly, to a multi-core video decoder system having at least one shared storage space accessed by different video decoder cores and related video decoding method.

Video coding technologies have been widely used in a variety of applications, including digital video streaming, digital video storage, digital television broadcasting, etc. If no video coding is used, the data amount of the video would be very large. For example, considering a video clip having 720×480 pixels per picture, 30 pictures per second and a playback time of 90 minutes, the data amount of this video clip is about 167.96 GB (Giga Bytes). The video coding technique achieves data compression by exploiting spatial and temporal redundancy in the video contents. Hence, a video encoder is designed to efficiently reduce spatial and temporal redundancy to achieve the video compression.

When receiving an encoded video bitstream, a video decoder is operative to reconstruct pictures of the video by decoding the encoded video bitstream. In general, the conventional video decoder employs one video decoder core to reconstruct pictures of a standard definition (SD) video or a high definition (HD) video. However, regarding an ultra high definition (UHD) video, it is composed of pictures each having a resolution higher than that of the SD/HD picture. For example, the UHD picture may have a resolution of 3840×2160. The data amount of one UHD picture is much larger than that of one SD/HD picture, and may exceed the decoding capability of the conventional single-core video decoder. If the conventional single-core video decoder fails to reconstruct one UHD picture in time, the display quality of the UHD video would be degraded.

SUMMARY

In accordance with exemplary embodiments of the present invention, a multi-core video decoder system having at least one shared storage space accessed by different video decoder cores and related video decoding method are proposed.

According to a first aspect of the present invention, an exemplary multi-core video decoder system includes a plurality of video decoder cores and a storage device. The video decoder cores are configured to decode a picture, wherein each of the video decoder cores decodes a portion of the picture. The storage device has at least one shared storage space accessed by different video decoder cores of the video decoder cores.

According to a second aspect of the present invention, an exemplary video decoding method is disclosed. The exemplary video decoding method includes: performing a plurality of video decoding operations to decode a picture, wherein each of the video decoding operations decodes a portion of the picture; and controlling different video decoding operations of the video decoding operations to access at least one shared storage space allocated in a storage device.

According to a third aspect of the present invention, an exemplary method for controlling N video decoder cores to access a storage device with M shared storage spaces is disclosed, where N and M are positive integers, N≥2, and M≥1. The exemplary method includes: controlling a video decoder core designated by a first index value to write information derived from decoding at least a portion of a coding row of a picture into a shared memory space designated by a second index value; and updating the first index value and then controlling another video decoder core designated by the first index value to read the information from the shared memory space designated by the second index value.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes using multiple video decoder cores to decode different coding rows in a picture, respectively. For example, multiple coding rows in a UHD picture may be decoded in a parallel manner, thus meeting the strict decoding requirement of a UHD video. In addition, the present invention further proposes using a shared storage space (e.g., a shared memory space) in a multi-core video decoding system. Hence, at least one shared storage space may be accessed by different video decoder cores, thus relaxing the storage size requirement of the multi-core video decoder system. Further details of the proposed multi-core video decoder system are described hereinafter with reference to accompanying drawings.

Figure 1:
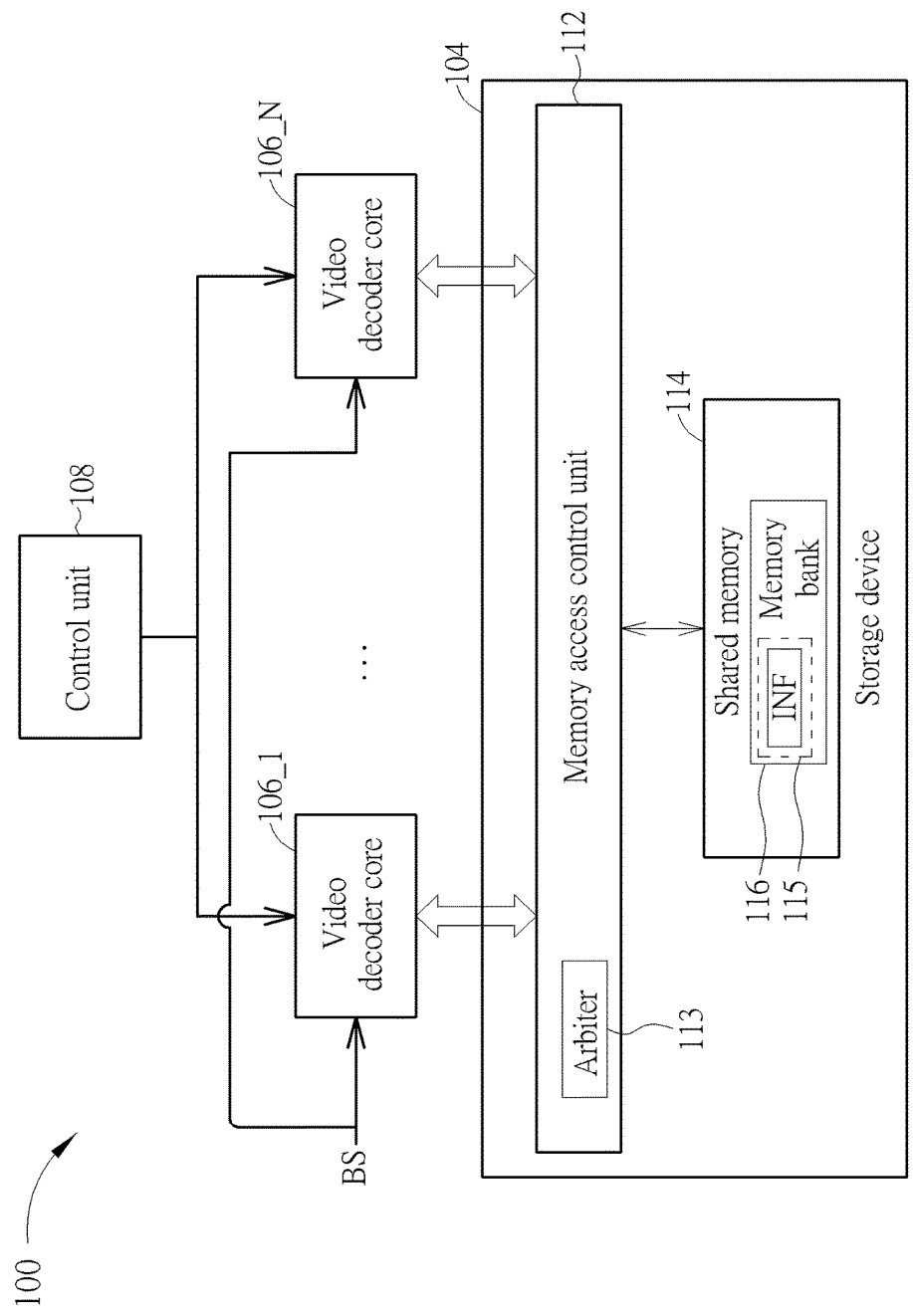
FIG. 1 is a block diagram illustrating a multi-core video decoder system according to an embodiment of the present invention.

FIG. 1 is a block diagram illustrating a multi-core video decoder system according to an embodiment of the present invention. The multi-core video decoder system 100 may be employed by any application requiring a video playback function, especially a UHD video playback function. The multi-core video decoder system 100 includes a storage device 104, a plurality of video decoder cores 106_1-106_N (N≥2), and a control unit 108. The multi-core video decoder system 100 is used to decode an incoming encoded video bitstream BS (e.g., an encoded bitstream of a UHD video). The encoded video bitstream BS includes encoded data of a plurality of pictures. Hence, the multi-core video decoder system 100 decodes encoded data of each picture to output a corresponding decoded picture to the following data processing stage. For example, the encoded video bitstream BS may be an output of a video encoder at a video source end, and received by an electronic device (e.g., a mobile phone) using the proposed multi-core video decoder system 100 through any transmission means coupled between the video source end and the electronic device.

Each picture to be decoded by the multi-core video decoder system 100 includes a plurality of coding rows, and each coding row is composed of a plurality of encoded data units. For example, multiple coding rows would form one picture if the picture is not partitioned into a plurality of tiles; and multiple coding rows would form one tile if the picture is partitioned into a plurality of tiles. Based on the coding standard employed, the coding row and the encoded data unit may have specific definitions. For example, when the encoded video bitstream BS is generated based on a coding standard such as MPEG4, H.264, etc., the encoded data unit is one macroblock (MB), and the coding row may include one or more MB rows, depending upon actual design consideration. When the encoded video bitstream BS is generated based on another coding standard such as HEVC (High Efficiency Video Coding), the encoded data unit is one coding tree unit (CTU) (also known as a largest coding unit (LCU)), and the coding row may include one or more CTU rows, depending upon actual design consideration.

For clarity and simplicity, the following assumes that each coding row decoded by one video decoder core is composed of one CTU/MB row only. However, this is not meant to be a limitation of the present invention. In an alternative design, each coding row decoded by one video decoder core may have more than one CTU/MB row. Hence, in a case where the encoded video bitstream BS is generated based on a coding standard such as MPEG4, H.264, etc., the encoded data unit is one MB, and the term "coding row" mentioned hereinafter may mean one MB row. In another case where the encoded video bitstream BS is generated based on another coding standard such as HEVC, the encoded data unit is one CTU (also known as LCU), and the term "coding row" mentioned hereinafter may mean one CTU row.

In this embodiment, more than one full-function video decoder core is available in the proposed multi-core video decoder system 100. More specifically, when the proposed multi-core video decoder system 100 is a dual-core system, the number of video decoder cores 106_1-106_N is equal to two (i.e., N=2); and when the proposed multi-core video decoder system 100 is a quad-core system, the number of video decoder cores 106_1-106_N is equal to four (i.e., N=4). The term "full-function video decoder core" means that the video decoder core may act as a standalone decoder configured to perform a complete decoding procedure specified by the video coding standard.

Figure 2:
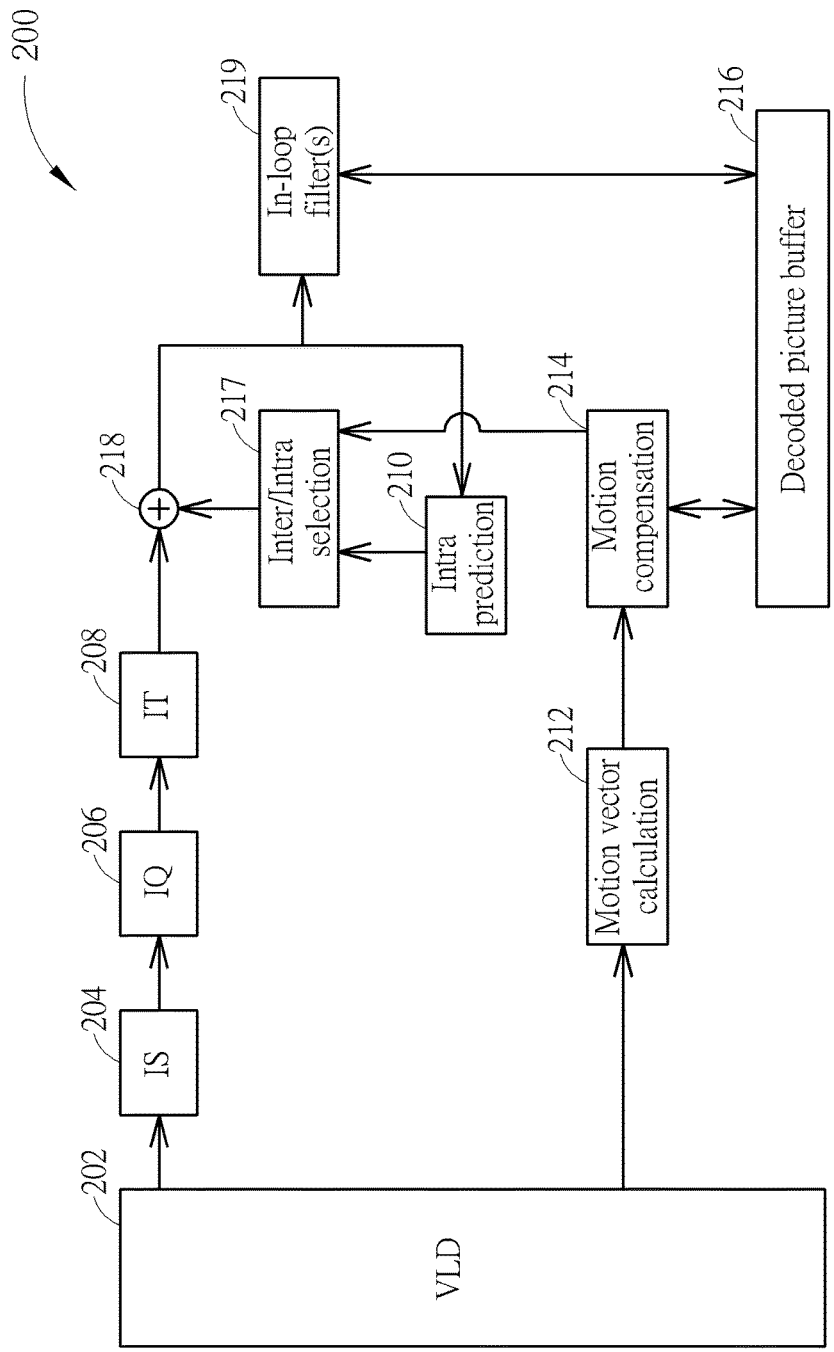
FIG. 2 is a block diagram illustrating a video decoder core used in the multi-core video decoder system shown in FIG. 1.

Please refer to FIG. 2, which is a block diagram illustrating a video decoder core used in the multi-core video decoder system 100 shown in FIG. 1. Each of the video decoder cores 106_1-106_N may be implemented using the exemplary video decoder core 200 shown in FIG. 2. The video decoder core 200 has all of the functional blocks of a typical video decoder. The functional blocks may include a variable length decoder (VLD) 202 used to do syntax parsing, an inverse scan (IS) block 204, an inverse quantization (IQ) block 206, an inverse transform (IT) block 208, an intra prediction block 210, a motion vector (MV) calculation block 212, a motion compensation block 214, a decoded picture buffer 216, an intra/inter selection block 217, an adder 218, and at least one in-loop filter 219 such as a deblocking filter and/or a sample adaptive offset (SAO) filter. As a person skilled in the pertinent art can readily understand details of each functional block shown in FIG. 2, further description is omitted here for the sake of brevity. The video decoder structure shown in FIG. 2 is for illustrative purposes only, and is not meant to be a limitation of the present invention. That is, when a different video coding standard is employed, each of the video decoder cores 106_1-106_N may be implemented using a different video decoder structure complying with the employed video coding standard. To put it simply, the present invention has no limitations on the implementation of video decoder cores 106_1-106_N.

Figure 3:
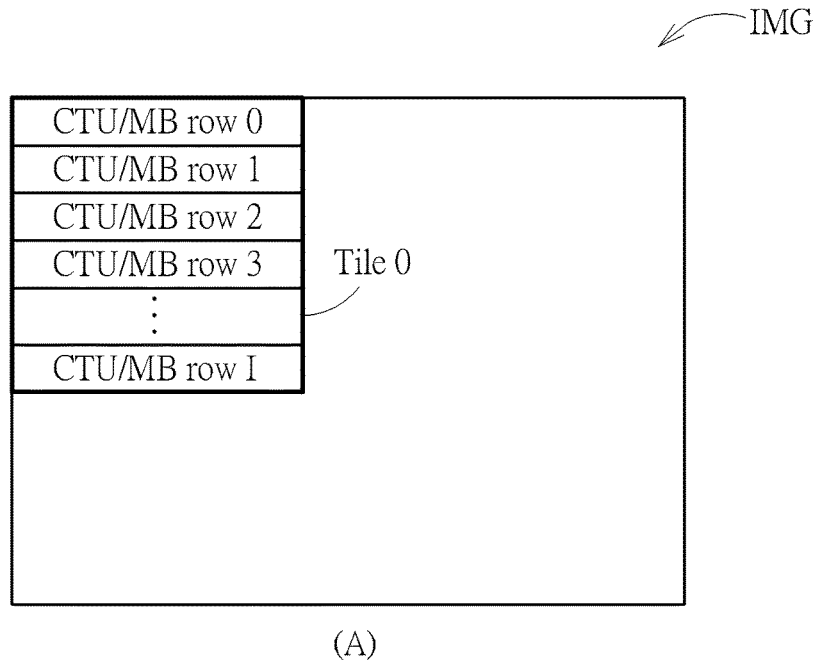
FIG. 3 is a diagram illustrating different arrangements of coding rows in a picture according to an embodiment of the present invention.
Figure 3:
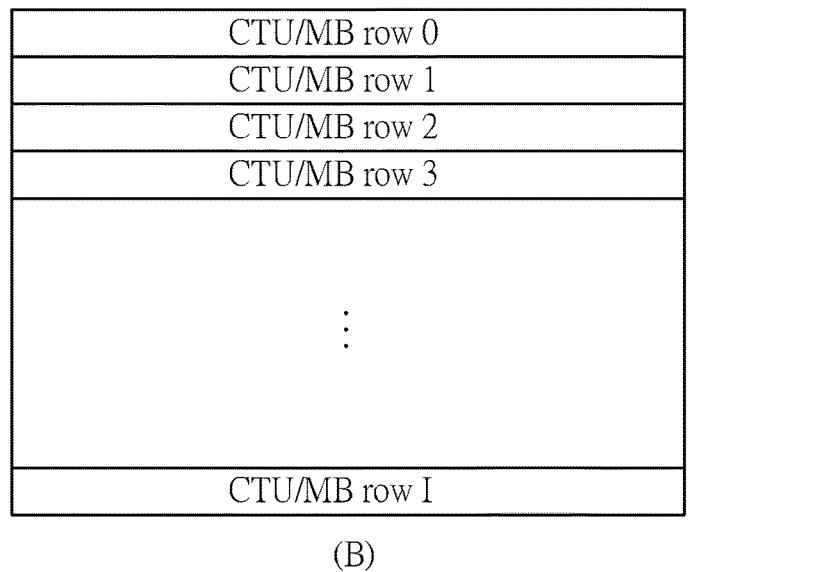

Since there are multiple video decoder cores 106_1-106_N available in the multi-core video decoder system 100, each of the video decoder cores 106_1-106_N may be involved in a decoding procedure of a portion of a picture, where the portion of the picture may include multiple coding rows. The control unit 108 is coupled to the video decoder cores 106_1-106_N, and arranged to control the video decoder cores 106_1-106_N to decode different coding rows in a picture. As shown in sub-diagram (A) of FIG. 3, the coding rows processed by the video decoder cores 106_1-106_N may be coding rows included in tile(s) of a picture (e.g., CTU/MB row 0-CTU/MB row I in tile 0 of picture IMG) if the picture is encoded based a plurality of tiles, where I≥N. As shown in sub-diagram (B) of FIG. 3, the coding rows processed by the video decoder cores 106_1-106_N may be part of coding rows included in a picture (e.g., CTU/MB row 0-CTU/MB row I in picture IMG) if the picture is encoded without being partitioned into a plurality of tiles, where I≥N.

It should be noted that there is dependency between vertically adjacent coding rows (e.g., a previous MB/CTU row and a current MB/CTU row). For example, decoding of the current coding row requires information given from a decoding result of the previous coding row immediately followed by the current coding row. Specifically, some information in the previous CTU/MB row above the current CTU/MB row is needed when a video decoder core performs a decoding operation, including intra prediction, motion vector calculation, in-loop de-blocking, etc., upon the current CTU/MB row. The needed information may be called "neighbor information" hereinafter.

Figure 4:
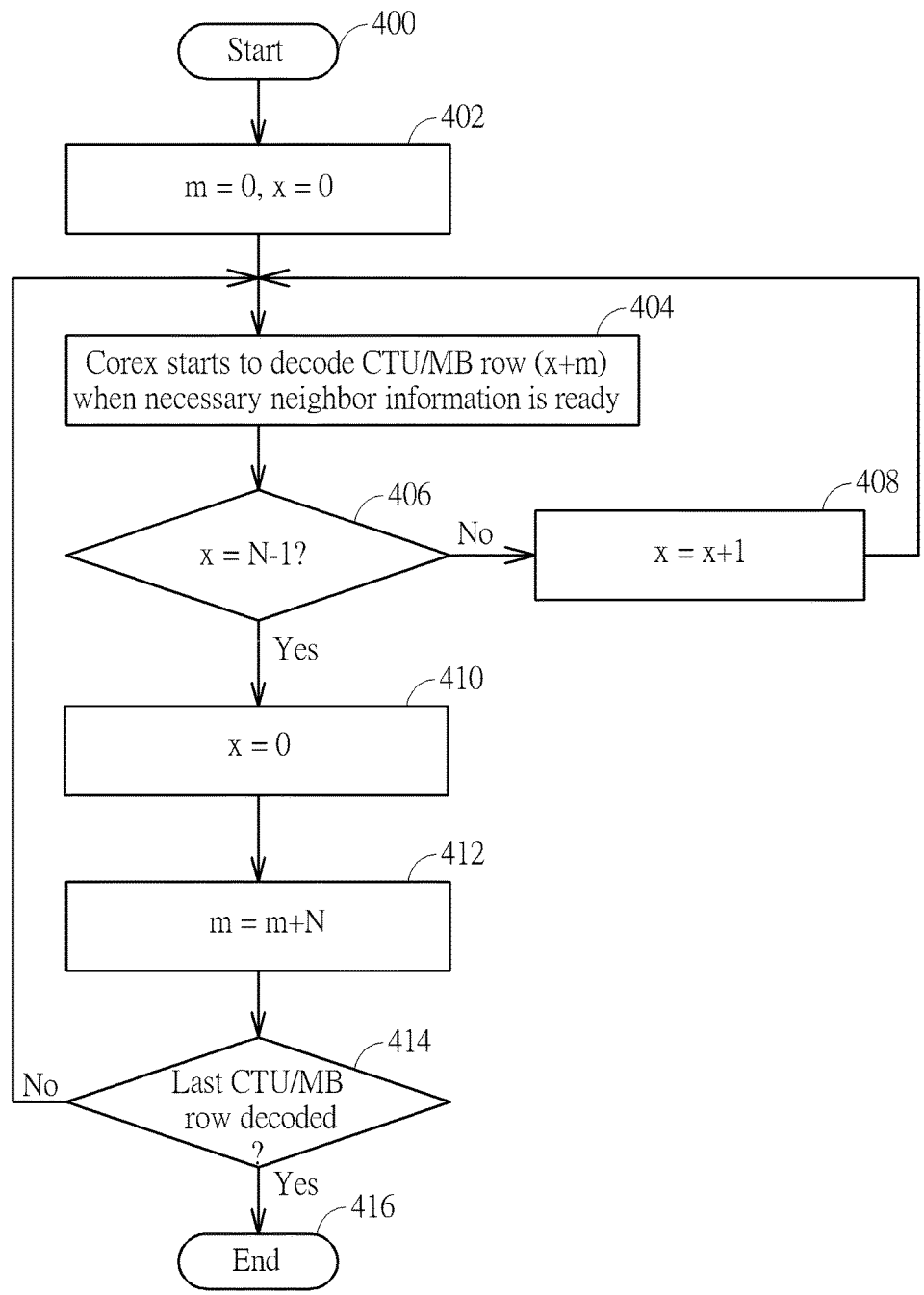
FIG. 4 is a flowchart illustrating a method for controlling a plurality of video decoder cores to decode a plurality of coding rows in a picture according to an embodiment of the present invention.

FIG. 4 is a flowchart illustrating a method for controlling a plurality of video decoder cores to decode a plurality of coding rows in a picture according to an embodiment of the present invention. Provided that the result is substantially the same, the steps are not required to be executed in the exact order shown in FIG. 4. The method may be employed by the control unit 108, and may be briefly summarized using following steps.

Step 400: Start.

Step 402: Set an index value m by an initial value (e.g., 0), and set another index value x by an initial value (e.g., 0).

Step 404: Control a video decoder core Corex designated by the index value x to start decoding a CTU/MB row (x+m) when the necessary neighbor information is ready.

Step 406: Check if x=N−1. If yes, go to step 410; otherwise, go to step 408.

Step 408: Increase the index value x by 1. Go to step 404.

Step 410: Reset the index value x to the initial value (e.g., 0).

Step 412: Increase the index value m by N.

Step 414: Check if the last CTU/MB row is decoded. If yes, go to step 416; otherwise, go to step 404.

Step 416: End.

Figure 5:
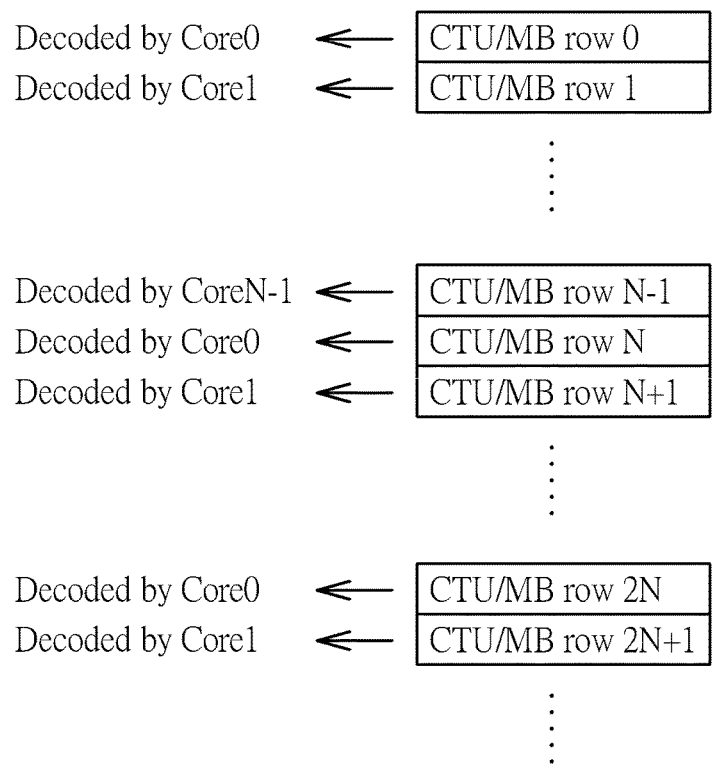
FIG. 5 is a diagram illustrating an example of using the method shown in FIG. 4 to control video decoder cores.

The video decoder cores 106_1-106_N may be denoted as Core0-CoreN−1, respectively. Since the number of coding rows to be decoded (e.g., CTU/MB row 0-CTU/MB row I shown in FIG. 3) is larger than the number of video decoder cores Core0-CoreN−1, the video decoder cores Core0-CoreN−1 may be controlled to alternately decode the coding rows. In other words, a video decoder core may be used to decode the $K^{th}$ coding row, the $(K+N)^{th}$ coding row, the $(K+2N)^{th}$ coding row, and so on. An example of using the method shown in FIG. 4 to control video decoder cores Core0-CoreN−1 to decode coding rows (e.g., CTU/MB row 0-CTU/MB row 2N+1) is illustrated in FIG. 5.

As mentioned above, neighbor information required for decoding a current coding row is derived from decoding a previous coding row, where the previous coding row is immediately followed by the current coding row, and the previous coding row and the current coding row are decoded using different video decoder cores. Hence, neighbor information needs to be exchanged between different video decoder cores. In this embodiment, the storage device 104 is arranged to buffer the neighbor information INF required for decoding any coding row in a picture. If the neighbor information INF required for decoding any coding row is stored in one dedicated memory space, a large-sized memory is needed, thus resulting in a higher production cost. The present invention therefore proposes sharing at least one storage space among different video decoder cores to buffer respective neighbor information, thereby relaxing the storage size requirement.

Please refer to FIG. 1 again. The storage device 104 is configured to provide at least one shared storage space. In this embodiment, the storage device 104 includes a memory access control unit 112 and a shared memory 114. Hence, the at least one shared storage space may be at least one shared memory space 115 allocated in the shared memory 114. The memory access control unit 112 serves as an interface to serve read requests and write requests issued from the video decoder cores 106_1-106_N for accessing the shared memory 114. By way of example, but not limitation, the shared memory 114 may be implemented using a static random access memory (SRAM) or registers. However, this is for illustrative purposes only, and is not meant to be a limitation of the present invention. That is, the storage device 104 may be implemented using other storage technology.

Figure 6:
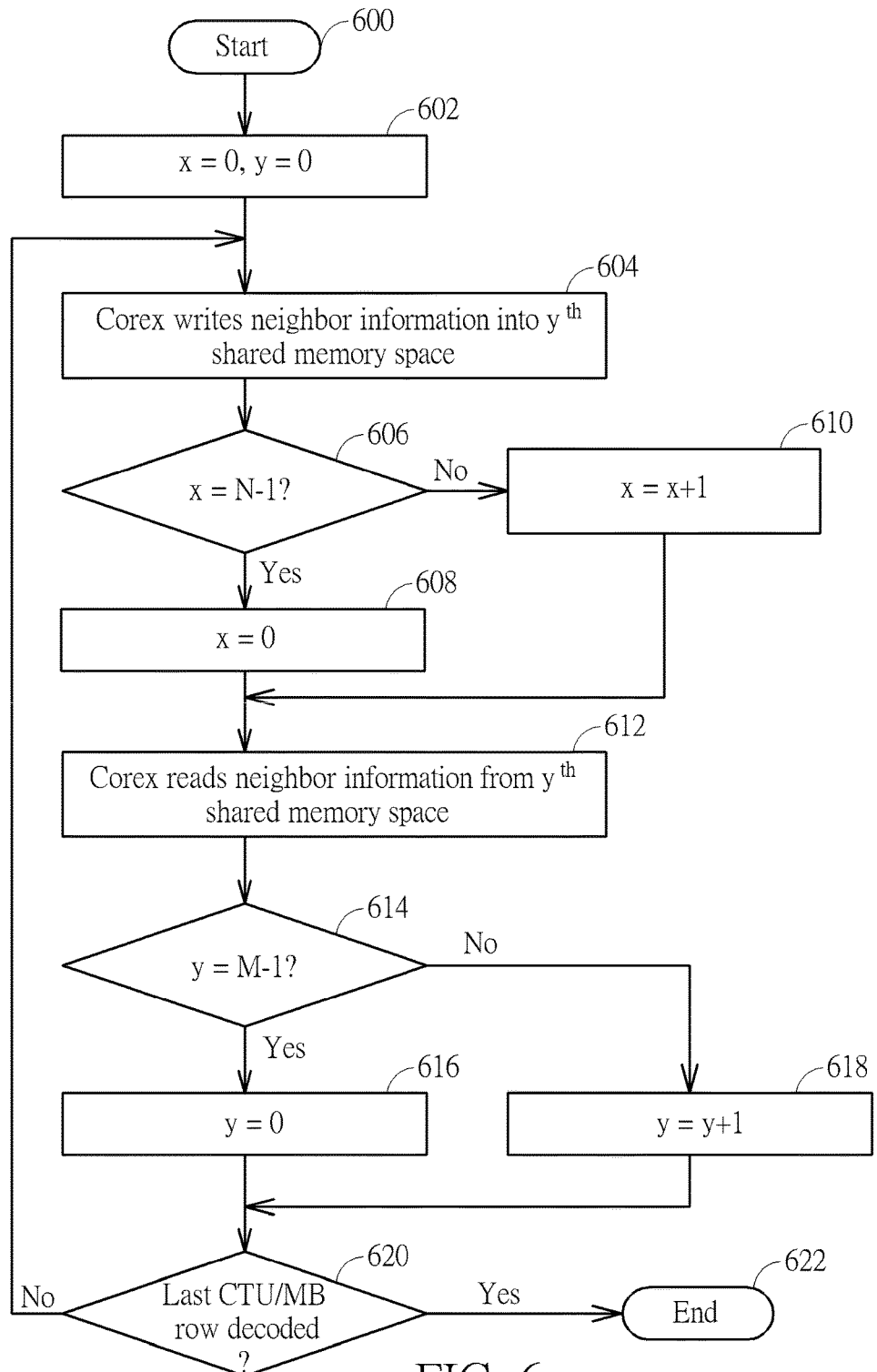
FIG. 6 is a flowchart illustrating a method for controlling different video decoder cores to access at least one shared storage space of a storage device according to an embodiment of the present invention.

FIG. 6 is a flowchart illustrating a method for controlling different video decoder cores to access at least one shared storage space of a storage device according to an embodiment of the present invention. Provided that the result is substantially the same, the steps are not required to be executed in the exact order shown in FIG. 6. The method may be briefly summarized using following steps.

Step 600: Start.

Step 602: Set an index value x by an initial value (e.g., 0), and set another index value y by an initial value (e.g., 0).

Step 604: Control a video decoder core Corex designated by the index value x to write neighbor information into the $y^{th}$ shared memory space (i.e., a shared memory space designated by the index value y) allocated in the shared memory 114.

Step 606: Check if the index value x is equal to a predetermined threshold value (e.g., N−1). If yes, go to step 608; otherwise, go to step 610.

Step 608: Reset/reinitialize the index value x to the initial value (e.g., 0). Go to step 612.

Step 610: Update the index value x by adding an adjustment value (e.g., +1) to the index value x.

Step 612: Control another video decoder core Corex designated by the index value x to read neighbor information from the $y^{th}$ shared memory space (i.e., the shared memory space designated by the index value y) allocated in the shared memory 114.

Step 614: Check if the index value y is equal to a predetermined threshold value (e.g., M−1). If yes, go to step 616; otherwise, go to step 618.

Step 616: Reset/reinitialize the index value y to the initial value (e.g., 0). Go to step 620.

Step 618: Update the index value y by adding an adjustment value (e.g., +1) to the index value y.

Step 620: Check if the last CTU/MB row is decoded. If yes, go to step 622; otherwise, go to step 604.

Step 622: End.

The video decoder cores 106_1-106_N may be denoted as Core0-CoreN−1, respectively. Suppose that the shared memory 114 is partitioned into M shared memory spaces 115, each acting as one shared storage space accessible to different video decoder cores. The value of M is a positive integer not smaller than 1, i.e., M≥1. In this example, the number of shared memory spaces is smaller than the number of coding rows to be decoded (e.g., CTU/MB row 0-CTU/MB row I shown in FIG. 3). Since the number of shared memory spaces is smaller than the number of coding rows to be decoded, the memory access control unit 112 may be configured to have at least one arbiter 113 implemented therein. Specifically, the number of arbiters 113 implemented in the memory access control unit 112 depends on the number of memory banks 116 used in the shared memory 114. In a case where the shared memory 114 has L memory banks 116 each having one or more shared memory spaces allocated therein, the memory access control unit 112 may have L arbiters 113 each used to arbitrate read requests and write requests issued for accessing the same memory bank. The value of L is a positive integer not smaller than 1, i.e., L≥1.

When more video decoder cores try to access the same shared memory space at the same time, the data access latency of a specific video decoder core is getting longer. If multiple shared memory spaces are allocated in different memory banks, the data access latency of the specific video decoder core can be shortened. Therefore, the decoding performance can be improved when the number of memory banks in the shared memory 114 is increased. It should be noted that the memory size and the bank number of the shared memory 114 may be decided according to several factors, including available system resource, decoding performance requirement, etc.

Since the number of coding rows to be decoded (e.g., CTU/MB row 0-CTU/MB row I shown in FIG. 3) is larger than the number of video decoder cores 106_1-106_N, the video decoder cores 106_1-106_N may be controlled to alternately decode coding rows, as illustrated in FIG. 4. As mentioned above, neighbor information required for decoding a current coding row is derived from decoding a previous coding row. Hence, based on a proposed memory dispatching rule used by the method shown in FIG. 6, the video decoder cores 106_1-106_N may be alternately granted to access the shared memory 114 for reading and writing neighbor information. For better understanding of technical features of the proposed memory dispatching rule, several examples are given as below.

Figure 7:
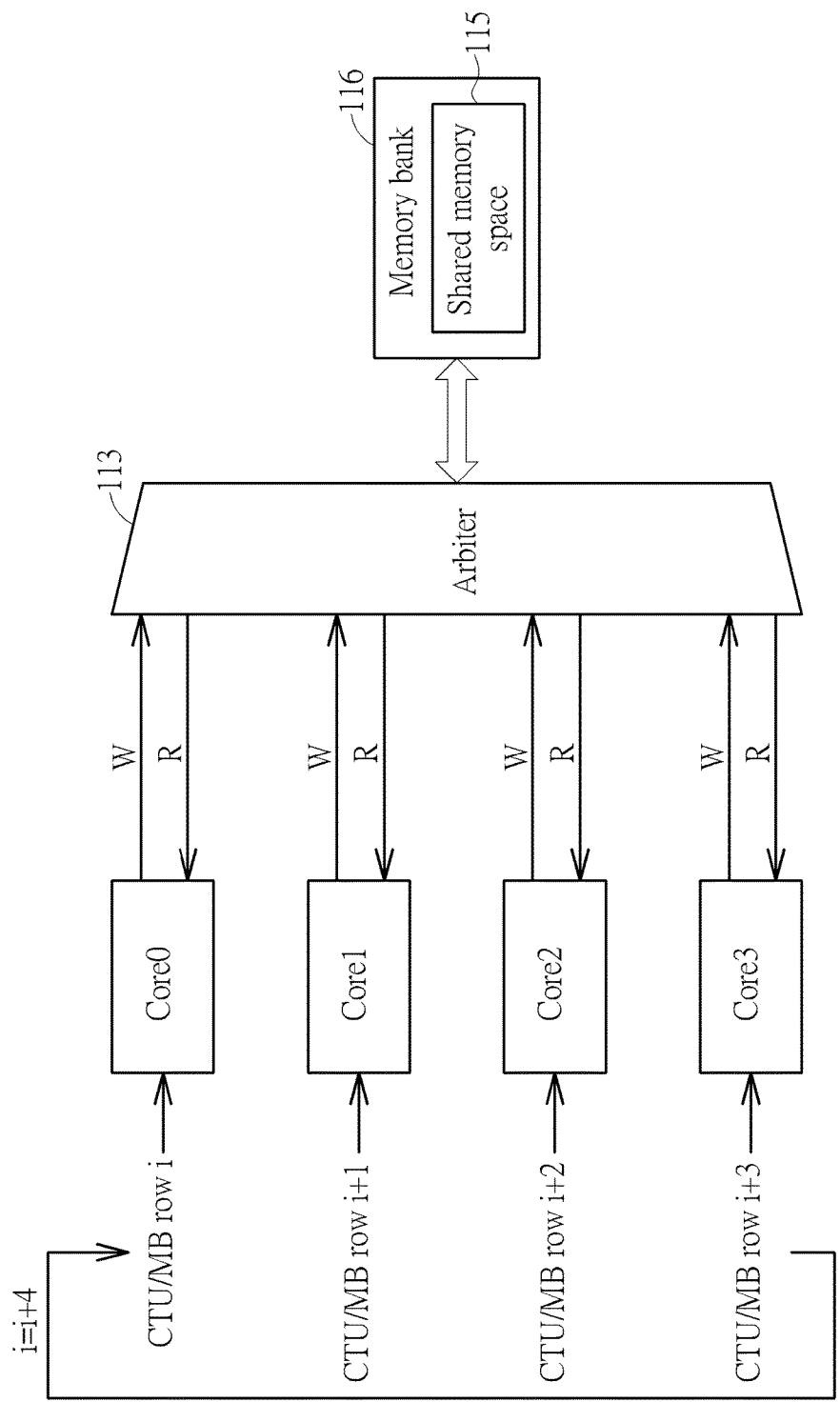
FIG. 7 is a diagram illustrating a first example of sharing at least one storage space among different video decoder cores according to the proposed memory dispatching rule.

FIG. 7 is a diagram illustrating a first example of sharing at least one storage space among different video decoder cores according to the proposed memory dispatching rule. In this example, the multi-core video decoder system 100 shown in FIG. 1 is a quad-core video decoder system. Hence, there are four video decoder cores 106_1-106_N denoted by Core0, Core1, Core 2, and Core3, where N=4. In addition, the shared memory 114 has only one shared memory space 115 allocated in the memory bank 116. Hence, the memory access control unit 112 has one arbiter 113 used for performing arbitration upon read requests and write requests issued from video decoder cores Core0-Core3. In one exemplary design, the control unit 108 may control the video decoder cores Core0-Core3 to decode coding rows in a sequential manner. That is, one video decoder core does not start decoding a current cording row (e.g., a current CTU/MB row) until another video decoder core finishes decoding a previous cording row (e.g., a previous CTU/MB row above the current CTU/MB row). In this case, the size of the shared storage space 115 may be equal to the size of one complete decoded coding row. That is, the shared storage space 115 is capable of buffering all decoded data of one coding row (e.g., one CTU/MB row). In another exemplary design, the control unit 108 may control the video decoder cores Core0-Core3 to decode coding rows in a parallel manner. That is, one video decoder core is allowed to start decoding a current cording row (e.g., a current CTU/MB row) before another video decoder core finishes decoding a previous cording row (e.g., a previous CTU/MB row above the current CTU/MB row). Hence, during the decoding procedure of the current cording row and the previous cording row, two video decoder cores are controlled to access the shared memory space 115 alternately. In this case, the shared storage space 115 may serve as a ring buffer, where the size of the shared storage space 115 may be smaller than the size of one complete decoded coding row. That is, the shared storage space 115 only buffers partial decoded data of one coding row (e.g., one CTU/MB row). Therefore, when decoding a specific coding row, a specific video decoder core may issue a write request for writing a first partial decoded data (which acts as neighbor information) into the shared storage space 115, and then issue another write request for writing a second partial decoded data (which acts as neighbor information) into the shared storage space 115. During the period that the specific video decoder core decodes the specific coding row, another specific video decoder core may issue a read request for reading the first partial decoded data from the shared storage space 115, and then issue another read request for reading the second partial decoded data from the shared storage space 115.

As shown in FIG. 7, CTU/MB row i, CTU/MB row i+1, CTU/MB row i+2, CTU/MB row i+3 are successive CTU/MB rows in the same picture to be decoded. That is, CTU/MB row i is immediately followed by CTU/MB row i+1, CTU/MB row i+1 is immediately followed by CTU/MB row i+2, and CTU/MB row i+2 is immediately followed by CTU/MB row i+3.

After the video decoder core Core0 is instructed to decode the CTU/MB row i, the video decoder core Core0 generates a read request to the arbiter 113 for reading neighbor information derived from decoding at least a portion (i.e., part or all) of the CTU/MB row i−1 from the shared memory space 115, and generates a write request to the arbiter 113 for writing neighbor information derived from decoding at least a portion (i.e., part or all) of the CTU/MB row i into the shared memory space 115.

After the video decoder core Core1 is instructed to decode the CTU/MB row i+1, the video decoder core Core1 generates a read request to the arbiter 113 for reading neighbor information derived from decoding at least a portion of the CTU/MB row i from the shared memory space 115, and generates a write request to the arbiter 113 for writing neighbor information derived from decoding at least a portion of the CTU/MB row i+1 into the shared memory space 115.

After the video decoder core Core2 is instructed to decode the CTU/MB row i+2, the video decoder core Core2 generates a read request to the arbiter 113 for reading neighbor information derived from decoding at least a portion of the CTU/MB row i+1 from the shared memory space 115, and generates a write request to the arbiter 113 for writing neighbor information derived from decoding at least a portion of the CTU/MB row i+2 into the shared memory space 115.

After the video decoder core Core3 is instructed to decode the CTU/MB row i+3, the video decoder core Core3 generates a read request to the arbiter 113 for reading neighbor information derived from decoding at least a portion of the CTU/MB row i+2 from the shared memory space 115, and generates a write request to the arbiter 113 for writing neighbor information derived from decoding at least a portion of the CTU/MB row i+3 into the shared memory space 115.

Figure 8:
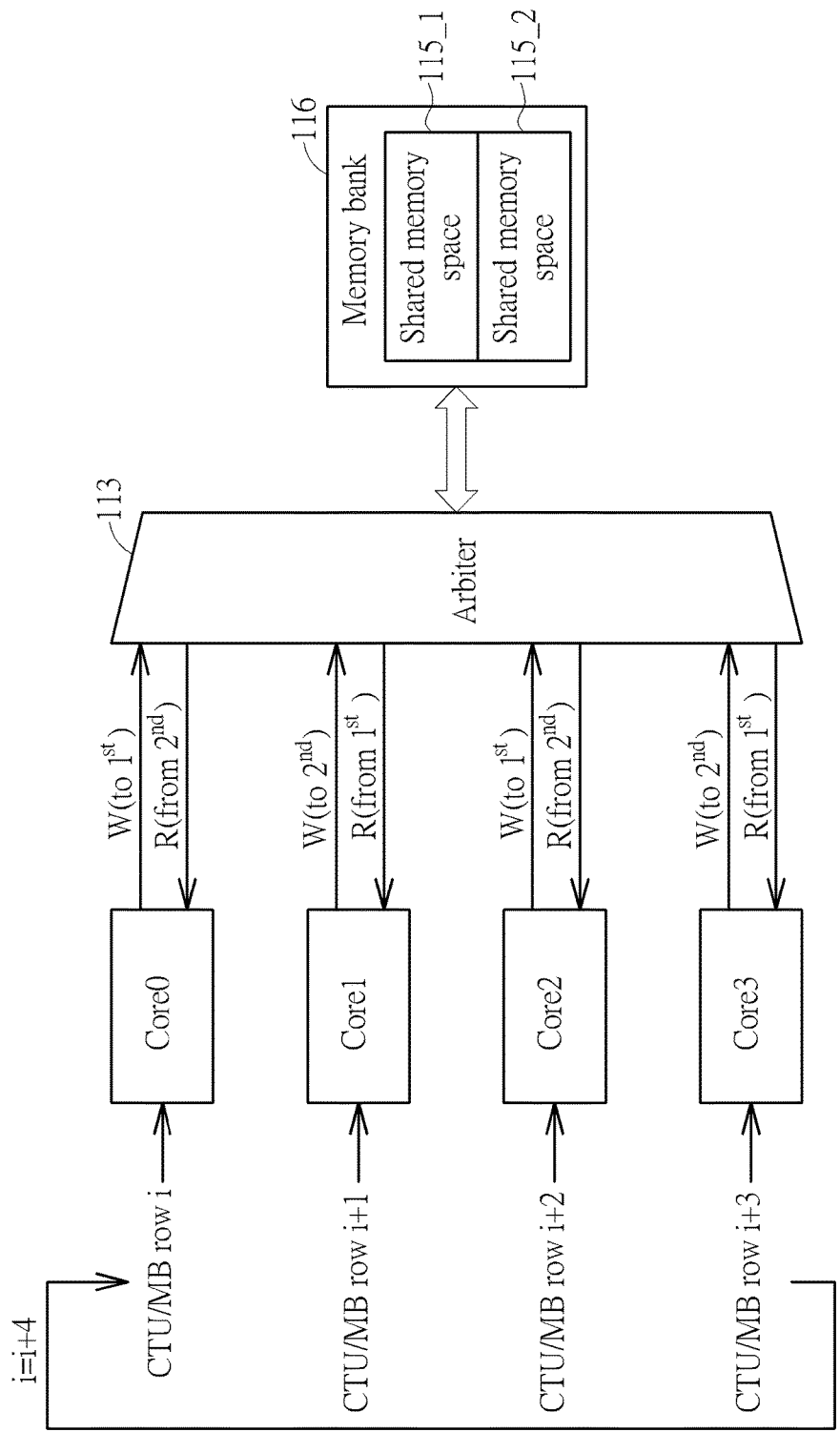
FIG. 8 is a diagram illustrating a second example of sharing at least one storage space among different video decoder cores according to the proposed memory dispatching rule.

FIG. 8 is a diagram illustrating a second example of sharing at least one storage space among different video decoder cores according to the proposed memory dispatching rule. In this example, the multi-core video decoder system 100 shown in FIG. 1 is a quad-core video decoder system. Hence, there are four video decoder cores 106_1-

106_N denoted by Core0, Core1, Core 2, and Core3, where N=4. In addition, the shared memory 114 has two shared memory spaces 115_1 and 115_2 allocated in the same memory bank 116. Hence, the memory access control unit 112 has one arbiter 113 used for performing arbitration upon read requests and write requests issued from the video decoder cores Core0-Core3. Further, the size of each of the shared storage spaces 115_1 and 115_2 may be equal to or smaller than the size of one complete decoded coding row, depending upon whether the video decoder cores Core0-Core3 are operated in a sequential manner or a parallel manner.

As shown in FIG. 8, CTU/MB row i, CTU/MB row i+1, CTU/MB row i+2, CTU/MB row i+3 are successive CTU/MB rows in the same picture to be decoded. After the video decoder core Core0 is instructed to decode the CTU/MB row i, the video decoder core Core0 generates a read request to the arbiter 113 for reading neighbor information derived from decoding at least a portion of the CTU/MB row i−1 from the shared memory space 115_2, and generates a write request to the arbiter 113 for writing neighbor information derived from decoding at least a portion of the CTU/MB row i into the shared memory space 115_1.

After the video decoder core Core1 is instructed to decode the CTU/MB row i+1, the video decoder core Core1 generates a read request to the arbiter 113 for reading neighbor information derived from decoding at least a portion of the CTU/MB row i from the shared memory space 115_1, and generates a write request to the arbiter 113 for writing neighbor information derived from decoding at least a portion of the CTU/MB row i+1 into the shared memory space 115_2.

After the video decoder core Core2 is instructed to decode the CTU/MB row i+2, the video decoder core Core2 generates a read request to the arbiter 113 for reading neighbor information derived from decoding at least a portion of the CTU/MB row i+1 from the shared memory space 115_2, and generates a write request to the arbiter 113 for writing neighbor information derived from decoding at least a portion of the CTU/MB row i+2 into the shared memory space 115_1.

After the video decoder core Core3 is instructed to decode the CTU/MB row i+3, the video decoder core Core3 generates a read request to the arbiter 113 for reading neighbor information derived from decoding at least a portion of the CTU/MB row i+2 from the shared memory space 115_1, and generates a write request to the arbiter 113 for writing neighbor information derived from decoding at least a portion of the CTU/MB row i+3 into the shared memory space 115_2.

Figure 9:
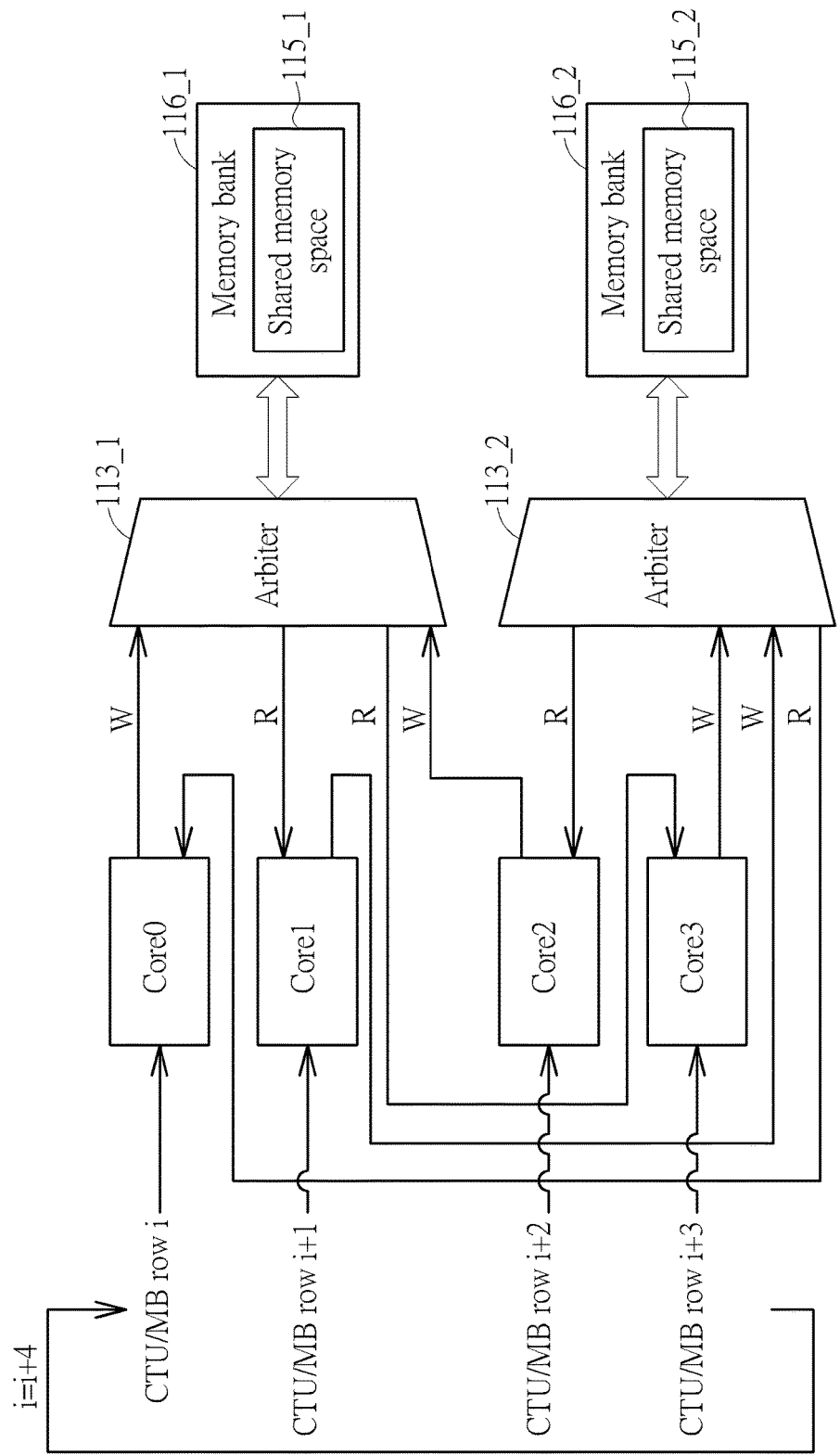
FIG. 9 is a diagram illustrating a third example of sharing at least one storage space among different video decoder cores according to the proposed memory dispatching rule.

FIG. 9 is a diagram illustrating a third example of sharing at least one storage space among different video decoder cores according to the proposed memory dispatching rule. In this example, the multi-core video decoder system 100 shown in FIG. 1 is a quad-core video decoder system. Hence, there are four video decoder cores 106_1-106_N denoted by Core0, Core1, Core 2, and Core3, where N=4. In addition, the shared memory 114 has two shared memory spaces 115_1 and 115_2 allocated in different memory banks 116_1 and 116_2, respectively. Hence, the memory access control unit 112 has two arbiters 113_1 and 113_2. The arbiter 113_1 is used for performing arbitration upon read requests issued from video decoder cores Core1, Core3 and write requests issued from video decoder cores Core0, Core2 for accessing the shared memory space 115_1. The arbiter 113_2 is used for performing arbitration upon read requests issued from video decoder cores Core0, Core2 and write requests issued from video decoder cores Core1, Core3 for accessing the shared memory space 115_2. Further, the size of each of the shared storage spaces 115_1 and 115_2 may be equal to or smaller than the size of one complete decoded coding row, depending upon whether the video decoder cores Core0-Core3 are operated in a sequential manner or a parallel manner.

As shown in FIG. 9, CTU/MB row i, CTU/MB row i+1, CTU/MB row i+2, CTU/MB row i+3 are successive CTU/MB rows in the same picture to be decoded. After the video decoder core Core0 is instructed to decode the CTU/MB row i, the video decoder core Core0 generates a read request to the arbiter 113_2 for reading neighbor information derived from decoding at least a portion of the CTU/MB row i−1 from the shared memory space 115_2, and generates a write request to the arbiter 113_1 for writing neighbor information derived from decoding at least a portion of the CTU/MB row i into the shared memory space 115_1.

After the video decoder core Core1 is instructed to decode the CTU/MB row i+1, the video decoder core Core1 generates a read request to the arbiter 113_1 for reading neighbor information derived from decoding at least a portion of the CTU/MB row i from the shared memory space 115_1, and generates a write request to the arbiter 113_2 for writing neighbor information derived from decoding at least a portion of the CTU/MB row i+1 into the shared memory space 115_2.

After the video decoder core Core2 is instructed to decode the CTU/MB row i+2, the video decoder core Core2 generates a read request to the arbiter 113_2 for reading neighbor information derived from decoding at least a portion of the CTU/MB row i+1 from the shared memory space 115_2, and generates a write request to the arbiter 113_1 for writing neighbor information derived from decoding at least a portion of the CTU/MB row i+2 into the shared memory space 115_1.

After the video decoder core Core3 is instructed to decode the CTU/MB row i+3, the video decoder core Core3 generates a read request to the arbiter 113_1 for reading neighbor information derived from decoding at least a portion of the CTU/MB row i+2 from the shared memory space 115_1, and generates a write request to the arbiter 113_2 for writing neighbor information derived from decoding at least a portion of the CTU/MB row i+3 into the shared memory space 115_2.

It should be noted that the number of video decoder cores and/or the number of shared storage spaces can be adjusted, depending upon the actual design consideration. That is, the multi-core video decoder system 100 is allowed to have more than four video decoder cores and/or more than two shared storage spaces.

Figure 10:
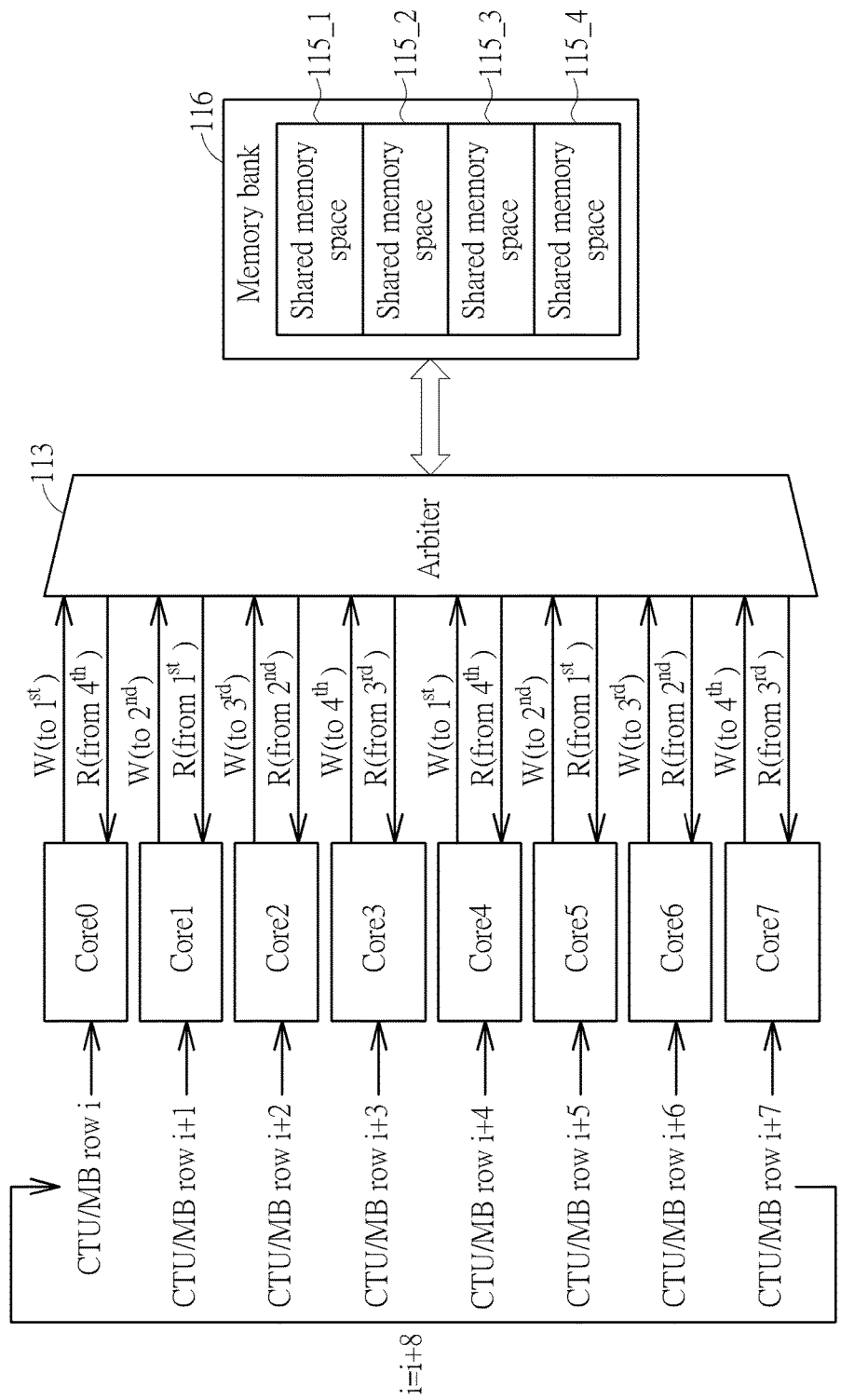
FIG. 10 is a diagram illustrating a fourth example of sharing at least one storage space among different video decoder cores according to the proposed memory dispatching rule.

FIG. 10 is a diagram illustrating a fourth example of sharing at least one storage space among different video decoder cores according to the proposed memory dispatching rule. In this example, the multi-core video decoder system 100 shown in FIG. 1 is an 8-core video decoder system. Hence, there are eight video decoder cores 106_1-106_N denoted by Core0, Core1, Core 2, Core3, Core4, Core5, Core6, and Core1, where N=8. In addition, the shared memory 114 has four shared memory spaces 115_1, 115_2, 115_3, and 115_4 allocated in the same memory bank 116. Hence, the memory access control unit 112 has one arbiter 113 used for performing arbitration upon read requests and write requests issued from the video decoder cores Core0-Core7. Further, the size of each of the shared storage spaces 115_1-115_4 may be equal to or smaller than the size of one complete decoded coding row, depending upon whether the video decoder cores Core0-Core7 are operated in a sequential manner or a parallel manner.

As shown in FIG. 10, CTU/MB row i, CTU/MB row i+1, CTU/MB row i+2, CTU/MB row i+3, CTU/MB row i+4, CTU/MB row i+5, CTU/MB row i+6, CTU/MB row i+7 are successive CTU/MB rows in the same picture to be decoded. After the video decoder core Core0 is instructed to decode the CTU/MB row i, the video decoder core Core0 generates a read request to the arbiter 113 for reading neighbor information derived from decoding at least a portion of the CTU/MB row i−1 from the shared memory space 115_4, and generates a write request to the arbiter 113 for writing neighbor information derived from decoding at least a portion of the CTU/MB row i into the shared memory space 115_1.

After the video decoder core Core1 is instructed to decode the CTU/MB row i+1, the video decoder core Core1 generates a read request to the arbiter 113 for reading neighbor information derived from decoding at least a portion of the CTU/MB row i from the shared memory space 115_1, and generates a write request to the arbiter 113 for writing neighbor information derived from decoding at least a portion of the CTU/MB row i+1 into the shared memory space 115_2.

After the video decoder core Core2 is instructed to decode the CTU/MB row i+2, the video decoder core Core2 generates a read request to the arbiter 113 for reading neighbor information derived from decoding at least a portion of the CTU/MB row i+1 from the shared memory space 115_2, and generates a write request to the arbiter 113 for writing neighbor information derived from decoding at least a portion of the CTU/MB row i+2 into the shared memory space 115_3.

After the video decoder core Core3 is instructed to decode the CTU/MB row i+3, the video decoder core Core3 generates a read request to the arbiter 113 for reading neighbor information derived from decoding at least a portion of the CTU/MB row i+2 from the shared memory space 115_3, and generates a write request to the arbiter 113 for writing neighbor information derived from decoding at least a portion of the CTU/MB row i+3 into the shared memory space 115_4.

As a person skilled in the art can readily understand the read operation and the write operation performed by each of the last four video decoder cores Core4-Core1 after reading above paragraphs directed to the read operation and the write operation performed by each of the first four video decoder cores Core0-Core3, further description is omitted here for brevity.

Figure 11:
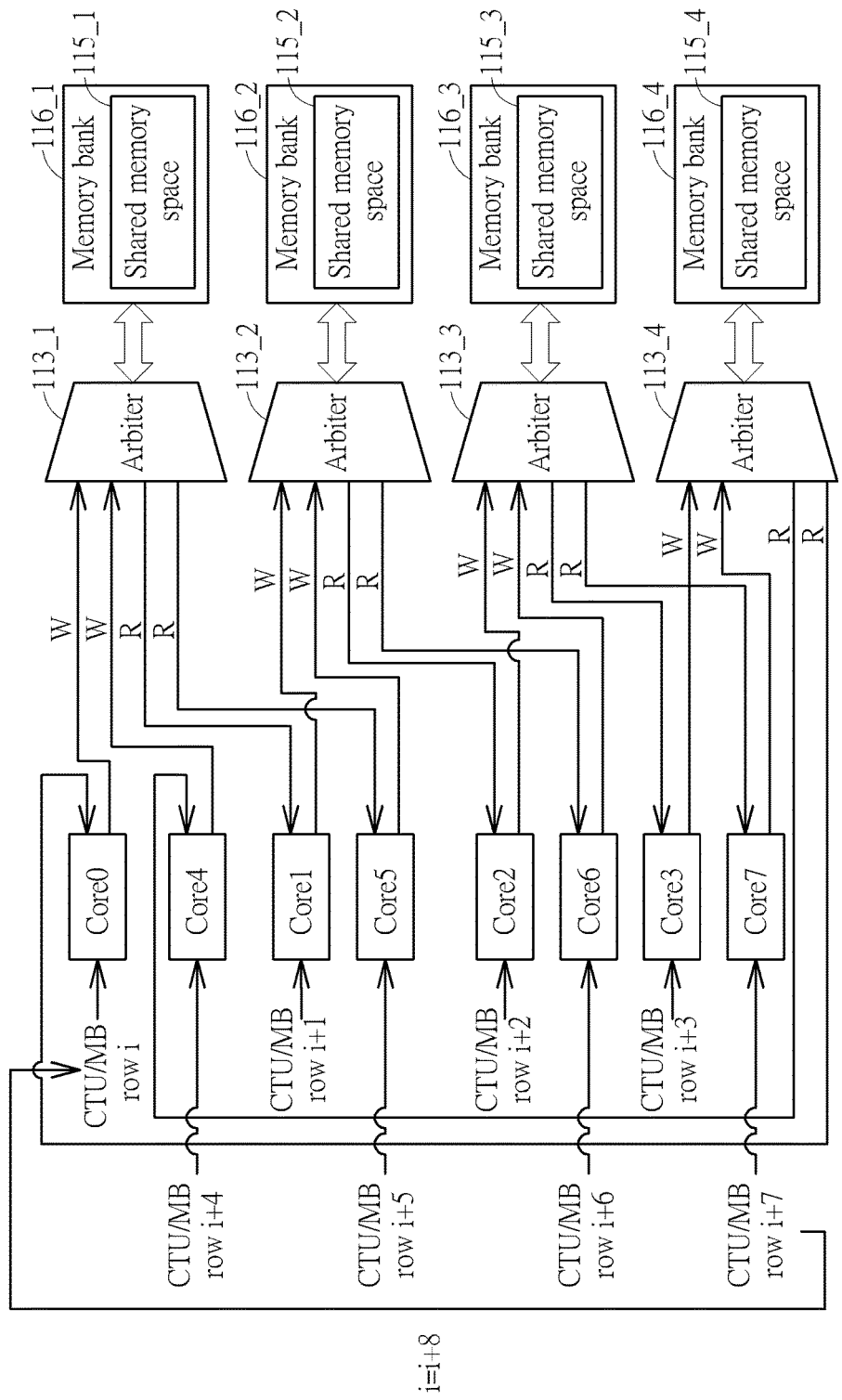
FIG. 11 is a diagram illustrating a fifth example of sharing at least one storage space among different video decoder cores according to the proposed memory dispatching rule.

FIG. 11 is a diagram illustrating a fifth example of sharing at least one storage space among different video decoder cores according to the proposed memory dispatching rule. In this example, the multi-core video decoder system 100 shown in FIG. 1 is an 8-core video decoder system. Hence, there are eight video decoder cores 106_1-106_N denoted by Core0, Core1, Core 2, Core3, Core4, Core5, Core6, and Core1, where N=8. In addition, the shared memory 114 has four shared memory spaces 115_1, 115_2, 115_3, 115_4 allocated in different memory banks 116_1, 116_2, 116_3, 116_4, respectively. Hence, the memory access control unit 112 has four arbiters 1131, 113_2, 113_3 and 113_4. The arbiter 113_1 is used for performing arbitration upon read requests issued from video decoder cores Core1, Core5 and write requests issued from video decoder cores Core0, Core4 for accessing the shared memory space 115_1. The arbiter 113_2 is used for performing arbitration upon read requests issued from video decoder cores Core 2, Core6 and write requests issued from video decoder cores Core1, Core5 for accessing the shared memory space 115_2. The arbiter 113_3 is used for performing arbitration upon read requests issued from video decoder cores Core3, Core7 and write requests issued from video decoder cores Core2, Core6 for accessing the shared memory space 115_3. The arbiter 113_4 is used for performing arbitration upon read requests issued from video decoder cores Core0, Core4 and write requests issued from video decoder cores Core3, Core7 for accessing the shared memory space 115_4. Further, the size of each of the shared storage spaces 115_1-115_4 may be equal to or smaller than the size of one complete decoded coding row, depending upon whether the video decoder cores Core0-Core7 are operated in a sequential manner or a parallel manner.

As shown in FIG. 11, CTU/MB row i, CTU/MB row i+1, CTU/MB row i+2, CTU/MB row i+3, CTU/MB row i+4, CTU/MB row i+5, CTU/MB row i+6, CTU/MB row i+7 are successive CTU/MB rows in the same picture to be decoded. After the video decoder core Core0 is instructed to decode the CTU/MB row i, the video decoder core Core0 generates a read request to the arbiter 113_4 for reading neighbor information derived from decoding at least a portion of the CTU/MB row i−1 from the shared memory space 115_4, and generates a write request to the arbiter 113_1 for writing neighbor information derived from decoding at least a portion of the CTU/MB row i into the shared memory space 115_1.

After the video decoder core Core1 is instructed to decode the CTU/MB row i+1, the video decoder core Core1 generates a read request to the arbiter 113_1 for reading neighbor information derived from decoding at least a portion of the CTU/MB row i from the shared memory space 115_1, and generates a write request to the arbiter 113_2 for writing neighbor information derived from decoding at least a portion of the CTU/MB row i+1 into the shared memory space 115_2.

After the video decoder core Core2 is instructed to decode the CTU/MB row i+2, the video decoder core Core2 generates a read request to the arbiter 113_2 for reading neighbor information derived from decoding at least a portion of the CTU/MB row i+1 from the shared memory space 115_2, and generates a write request to the arbiter 113_3 for writing neighbor information derived from decoding at least a portion of the CTU/MB row i+2 into the shared memory space 115_3.

After the video decoder core Core3 is instructed to decode the CTU/MB row i+3, the video decoder core Core3 generates a read request to the arbiter 113_3 for reading neighbor information derived from decoding at least a portion of the CTU/MB row i+2 from the shared memory space 115_3, and generates a write request to the arbiter 113_4 for writing neighbor information derived from decoding at least a portion of the CTU/MB row i+3 into the shared memory space 115_4.

As a person skilled in the art can readily understand the read operation and the write operation performed by each of the last four video decoder cores Core4-Core7 after reading above paragraphs directed to the read operation and the write operation performed by each of the first four video decoder cores Core0-Core3, further description is omitted here for brevity.

As mentioned above, the number of video decoder cores and/or the number of shared storage spaces can be adjusted, depending upon the actual design consideration. Hence, the number of video decoder cores may be an odd number or an even number; and the number of shared storage spaces may be an odd number or an even number.

Figure 12:
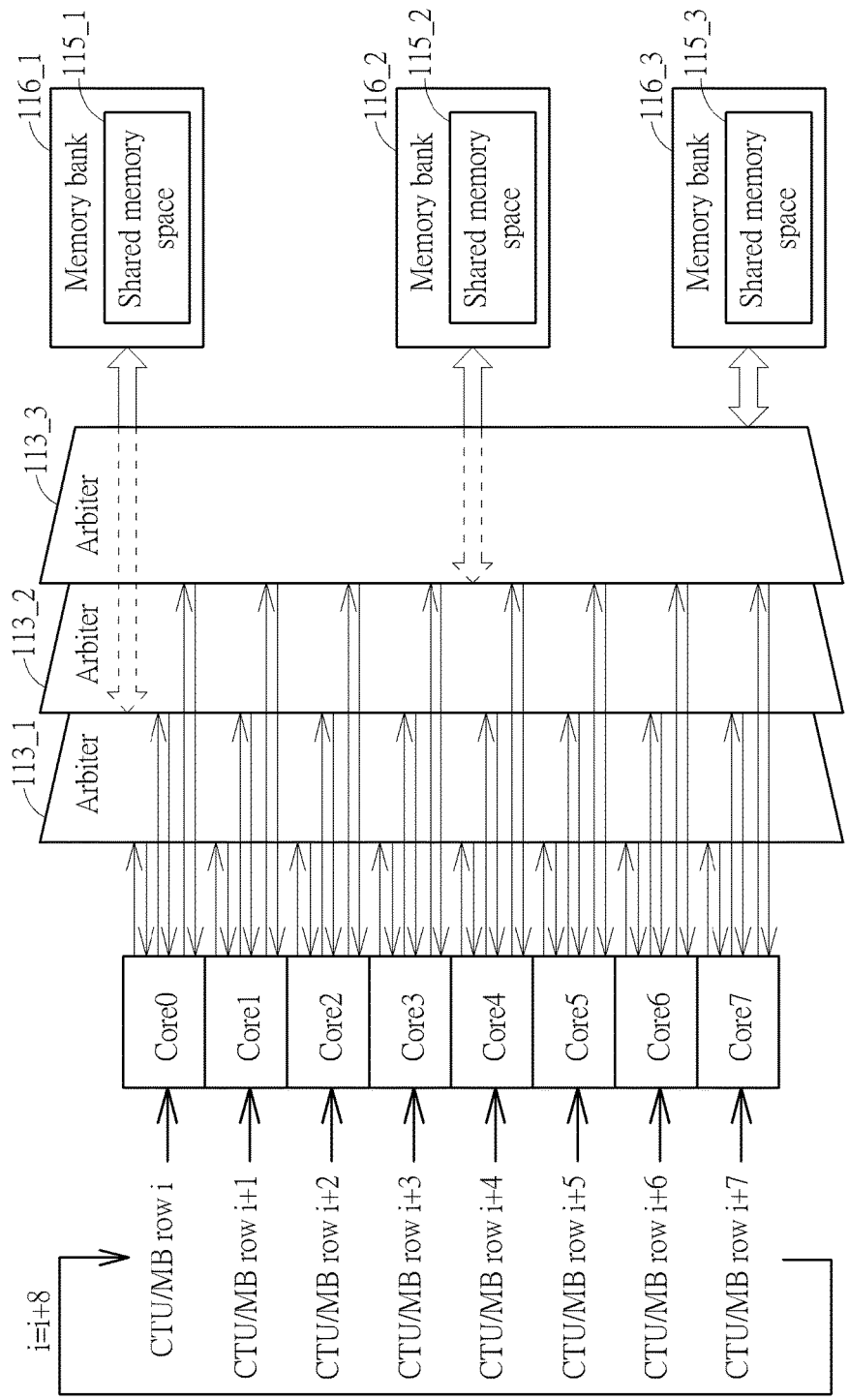
FIG. 12 is a diagram illustrating a sixth example of sharing at least one storage space among different video decoder cores according to the proposed memory dispatching rule.

FIG. 12 is a diagram illustrating a sixth example of sharing at least one storage space among different video decoder cores according to the proposed memory dispatching rule. In this example, the multi-core video decoder system 100 shown in FIG. 1 is an 8-core video decoder system. Hence, there are eight video decoder cores 106_1-106_N denoted by Core0, Core1, Core 2, Core3, Core4, Core5, Core6, and Core1, where N=8. In addition, the shared memory 114 has three shared memory spaces 115_1, 115_2, 115_3 allocated in different memory banks 116_1, 116_2, 116_3, respectively. Hence, the memory access control unit 112 has three arbiters 113_1, 113_2, 113_3. The arbiter 113_1 is used for performing arbitration upon read requests and write requests issued from the video decoder cores Core0-Core7 for accessing the shared memory space 115_1. The arbiter 113_2 is used for performing arbitration upon read requests and write requests issued from the video decoder cores Core0-Core7 for accessing the shared memory space 115_2. The arbiter 113_3 is used for performing arbitration upon read requests and write requests issued from the video decoder cores Core0-Core7 for accessing the shared memory space 115_3. Further, the size of each of the shared storage spaces 115_1-115_4 may be equal to or smaller than the size of one complete decoded coding row, depending upon whether the video decoder cores Core0-Core7 are operated in a sequential manner or a parallel manner.

Since the number of shared memory spaces is an odd number and the number of the video decoder cores is an even number, a video decoder core may read the shared memory space 115_3 and write the shared memory space 115_1 when decoding the $K^{th}$ CTU/MB row in a picture, may read the shared memory space 115_1 and write the shared memory space 115_2 when decoding the $(K+8)^{th}$ CTU/MB row in the same picture, and may read the shared memory space 115_2 and write the shared memory space 115_3 when decoding the $(K+16)^{th}$ CTU/MB row in the same picture. In other words, each of the arbiters 113_1, 113_2, 113_3 is configured to deal with read request and write request issued from any of the video decoder cores Core0-Core7.

As a person skilled in the art can readily understand the read operation and the write operation performed by the video decoder cores shown in FIG. 12 after reading above paragraphs directed to the read operation and the write operation performed by the video decoder cores shown in FIG. 11, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-core video decoder system, comprising:
   a plurality of video decoder cores, configured to decode a picture, wherein each of the video decoder cores decodes a portion of the picture; and
   a storage device, having at least one shared storage space accessed by different video decoder cores of the video decoder cores;
   wherein the picture comprises different coding rows decoded by the different video decoder cores, respectively; one of the different video decoder cores writes decoded data of one of the different coding rows into the at least one shared storage space; and another of the different video decoder cores reads the decoded data from the at least one shared storage space;
   wherein the at least one shared storage space comprises a first shared storage space and a second shared storage space, and the video decoder cores comprise:
      a first video decoder core, configured to read first information derived from decoding at least a portion of a first coding row of the picture from the second shared storage space, and write second information derived from decoding at least a portion of a second coding row of the picture into the first shared storage space; and
      a second video decoder core, configured to read the second information from the first shared storage space, and write third information derived from decoding at least a portion of a third coding row of the picture into the second shared storage space;
   wherein a number of shared storage spaces allocated in the storage device is smaller than a number of coding rows included in the picture, the first coding row is immediately followed by the second coding row, and the second coding row is immediately followed by the third coding row;
   wherein the first shared storage space and the second shared storage space are allocated in a same memory bank.

2. The multi-core video decoder system of claim 1, wherein decoding of each coding row in the picture performs a write operation and a read operation upon different shared storage spaces allocated in the storage device, respectively; and each of said different shared storage spaces is shared by read operations performed by decoding of different coding rows in the picture or is shared by write operations performed by decoding of different coding rows in the picture.

3. A multi-core video decoder system, comprising:
   a plurality of video decoder cores, configured to decode a picture, wherein each of the video decoder cores decodes a portion of the picture; and
   a storage device, having at least one shared storage space accessed by different video decoder cores of the video decoder cores;
   wherein the picture comprises different coding rows decoded by the different video decoder cores, respectively; one of the different video decoder cores writes decoded data of one of the different coding rows into the at least one shared storage space; and another of the different video decoder cores reads the decoded data from the at least one shared storage space;
   wherein the at least one shared storage space comprises at least a first shared storage space, a second shared storage space and a third storage space, and the video decoder cores comprise:
      a first video decoder core, configured to read first information derived from decoding at least a portion of a first coding row of the picture from the third shared storage space, and write second information derived from decoding at least a portion of a second coding row of the picture into the first shared storage space; and
      a second video decoder core, configured to read the second information from the first shared storage space, and write third information derived from decoding at least a portion of a third coding row of the picture into the second shared storage space;
   wherein a number of shared storage spaces allocated in the storage device is smaller than a number of coding rows included in the picture, the first coding row is immediately followed by the second coding row, and the second coding row is immediately followed by the third coding row;

wherein the first shared storage space, the second shared storage space and the third shared storage space are allocated in a same memory bank.

4. The multi-core video decoder system of claim 3, wherein decoding of each coding row in the picture performs a write operation and a read operation upon different shared storage spaces allocated in the storage device, respectively; and each of said different shared storage spaces is shared by read operations performed by decoding of different coding rows in the picture or is shared by write operations performed by decoding of different coding rows in the picture.

5. A video decoding method, comprising:
  allocating a first shared storage space and a second shared storage space in a same memory bank;
  performing a plurality of video decoding operations to decode a picture, wherein each of the video decoding operations decodes a portion of the picture; and
  controlling different video decoding operations of the video decoding operations to access at least one shared storage space allocated in a storage device;
wherein the picture comprises different coding rows decoded by the different video decoding operations, respectively; one of the different video decoding operations writes decoded data of one of the different coding rows into the at least one shared storage space; and another of the different video decoding operations reads the decoded data from the at least one shared storage space;
wherein the at least one shared storage space comprises the first shared storage space and the second shared storage space; and controlling the different video decoding operations of the video decoding operations to access the at least one shared storage space comprises:
  controlling a first video decoding operation to read first information derived from decoding at least a portion of a first coding row of the picture from the second shared storage space, and write second information derived from decoding at least a portion of a second coding row of the picture into the first shared storage space; and
  controlling a second video decoding operation to read the second information from the first shared storage space, and write third information derived from decoding at least a portion of a third coding row of the picture into the second shared storage space;
wherein a number of shared storage spaces allocated in the storage device is smaller than a number of coding rows included in the picture, the first coding row is immediately followed by the second coding row, and the second coding row is immediately followed by the third coding row.

6. The video decoding method of claim 5, wherein decoding of each coding row in the picture performs a write operation and a read operation upon different shared storage spaces allocated in the storage device, respectively; and each of said different shared storage spaces is shared by read operations performed by decoding of different coding rows in the picture or is shared by write operations performed by decoding of different coding rows in the picture.

7. A video decoding method, comprising:
  allocating a first shared storage space, a second shared storage space and a third shared storage space in a same memory bank;
  performing a plurality of video decoding operations to decode a picture, wherein each of the video decoding operations decodes a portion of the picture; and
  controlling different video decoding operations of the video decoding operations to access at least one shared storage space allocated in a storage device;
wherein the picture comprises different coding rows decoded by the different video decoding operations, respectively; one of the different video decoding operations writes decoded data of one of the different coding rows into the at least one shared storage space; and another of the different video decoding operations reads the decoded data from the at least one shared storage space;
wherein the at least one shared storage space comprises at least the first shared storage space, the second shared storage space and the third storage space; and controlling the different video decoding operations of the video decoding operations to access the at least one shared storage space comprises:
  controlling a first video decoding operation to read first information derived from decoding at least a portion of a first coding row of the picture from the third shared storage space, and write second information derived from decoding at least a portion of a second coding row of the picture into the first shared storage space; and
  controlling a second video decoding operation to read the second information from the first shared storage space, and write third information derived from decoding at least a portion of a third coding row of the picture into the second shared storage space;
wherein a number of shared storage spaces allocated in the storage device is smaller than a number of coding rows included in the picture, the first coding row is immediately followed by the second coding row, and the second coding row is immediately followed by the third coding row.

8. The video decoding method of claim 7, wherein decoding of each coding row in the picture performs a write operation and a read operation upon different shared storage spaces allocated in the storage device, respectively; and each of said different shared storage spaces is shared by read operations performed by decoding of different coding rows in the picture or is shared by write operations performed by decoding of different coding rows in the picture.

* * * * *